US005597598A

United States Patent [19]

van Rijn et al.

[11] Patent Number: 5,597,598

[45] Date of Patent: Jan. 28, 1997

[54] FUNGICIDE COMPOSITION TO PREVENT THE GROWTH OF MOULD ON FOODSTUFF AND AGRICULTURAL PRODUCTS

[75] Inventors: Ferdinand T. J. van Rijn, Delft; Hong S. Tan, Bleiswijk; Martinus J. M. Warmerdam, Delft, all of Netherlands

[73] Assignee: Gist-Brocades N.V., Netherlands

[21] Appl. No.: 514,746

[22] Filed: Aug. 14, 1995

Related U.S. Application Data

[63] Continuation of Ser. No. 188,048, Jan. 26, 1994, abandoned.

[30] Foreign Application Priority Data

Jan. 27, 1993 [EP] European Pat. Off. .............. 93200200

[51] Int. Cl.$^{6}$ .............................. A23B 4/14; A23B 5/12; A23B 7/14

[52] U.S. Cl. .............................................. 426/310; 426/335

[58] Field of Search ...................................... 426/310, 335

[56] References Cited

FOREIGN PATENT DOCUMENTS 0513922 11/1992 European Pat. Off. .

*Primary Examiner*—Carolyn Paden

*Attorney, Agent, or Firm*—Bierman and Muserlian

[57] ABSTRACT

An antifungal composition is disclosed which comprises an antifungal agent of the polyene type, an acidific antifungal compound and an additional organic acid or its alkali or earth alkali salt. The use of this composition to treat food and agricultural products is disclosed.

7 Claims, 6 Drawing Sheets

FUNGICIDE COMPOSITION TO PREVENT THE GROWTH OF MOULD ON FOODSTUFF AND AGRICULTURAL PRODUCTS

PRIOR APPLICATION

This application is a continuation of U.S. patent application Ser. No. 188,048 filed Jan. 26, 1994, now abandoned.

STATE OF THE ART

The invention relates to an antifungal composition to be used on foodstuffs such as cheese or sausages or on agricultural products such as fruit, vegetables, tubers and flower bulbs, to a method for treating these foodstuffs and products with the preparation, and to foodstuffs and agricultural products when so treated.

Use of natamycin to prevent growth of mould

For more then 20 years natamycin has been used to prevent growth of mold on cheese and sausages.

Cheeses are treated by immersion in a suspension of natamycin in water or covered by an emulsion of a polymer in water, (mostly polyvinyl acetate). Sausages are mainly treated by immersion or by spraycoating with a suspension of natamycin in water. Usually aqueous suspensions for immersion treatments contain 0.1 to 0.2% of natamycin, while polymer emulsions for coating purposes contain 0.01 to 0.05% of natamycin.

Mostly these treatments are highly effective at preventing spoilage by mold. However because of the low solubility of natamycin, those mould which are less susceptible to natamycin are not fully inhibited, thus some spoilage may still occur. Examples of fungi which are more tolerant towards natamycin are *Verticilium cinnabarimam, Butrytis cinerea* and Trichophyton species. Among Aspergillus, Fusarium and Penicillium species also more tolerant species may be found. An example of such a species is *Penicillium echinulatum* var. discolor.

Use of organic acids to prevent growth of spoilage flora

Spoilage by microflora may also be controlled by the use of organic acidic compounds or their salts. Examples are benzoic acid, sorbic acid and propionic acid or their salts. Mostly these acids are used to control bacterial spoilage, but to some extend moulds are also inhibited. However these acids are only effective when used in high concentrations. For instance the effective concentration of calcium sorbate in a polymer coating is from 3 to 5%. Moreover the use of high concentrations of these acids often leads to organoleptic defects of the foodstuff.

Use of natamycin and acids

In some cases the disadvantages mentioned before may be solved by using natamycin together with an organic acid, optionally in combination with a solvent like an alkanol. DE-2529532 (Gist-Brocades N.V.) describes the combination of natamycin with an organic acid and an alcohol in an aqueous system. The combination is especially effective for the protection of citrus fruit against decay by mould. Due to the higher solubility of natamycin in the system not only is the mould on the surface inhibited, but also growth beneath the surface of the peel is inhibited. The disadvantage of such a system is the necessity of using an alcohol and the lesser stability of natamycin in the system compared to that in water.

J-61146153 (Nippon Nosan Kogyo) describes the use of an antibiotic and an antibacterial compound in an aqueous organic acid solution to prevent contamination of the mulberry leaf beds in which silkworms are reared. The antibiotic may be of the macrolide type (like natamycin) and the antibacterial is e.g. sorbic acid, sorbate, propionic acid or propionate. The antibiotic controls mold and the acid controls bacteria.

DE-848934 (Gist-brocades) describes liquid antifungal compositions containing natamycin and an acidic organic compound for treating infection in animals, particularly livestock. A preferred acid is e.g. citric acid. The liquid composition preferably has a pH of 2–4.5. The composition is especially useful for the treatment of infections in cattle caused by *Trichophyton verrucosum,* a microorganism which is more tolerant to natamycin than food-mould. (The MIC or minimal inhibitory concentration of Trichophyton species is 12.5–25.0 mcg/ml and that of food spoilage fungi is 1–10 mcg/ml;). Apparently the effectiveness of the composition is due to the increase in solubility of natamycin at low pH. Unfortunately natamycin is relatively unstable at low pH and therefore the solution is only useful for a limited length of time.

Lodi et al. describes experiments using combinations of natamycin with potassium sorbate and/or sodium propionate for the treatment of cheeses. In general the results are satisfactory. However because of the poor action of sorbate and propionate together, the combination of natamycin with sodium propionate and potassium sorbate has no additional advantages. A further disadvantage is that high concentrations of acidic antifungal agents are necessary.

TorLorello et al. describe the control of spoilage flora on cottage cheese using natamycin together with propionate. The natamycin is used for the control of yeast and of Penicillium species and the propoinate for the control of Bacillus and Pseudomonas species.

SUMMARY OF THE INVENTION

In summary, natamycin provides an effective means of controlling common food spoilage mold, but is insufficiently soluble in water to inhibit more tolerant species.

Organic acidic compound and their salts can be used to control both bacterial and fungal flora, but fungi with a high tolerance to natamycin may still be difficult to an extremely low pH and/or by using an additional solvent like an alcohol, but in general the natamycin in the solution is unstable.

Unexpectedly it has been found that the combined action towards mould of a polyene antifungal agent and an acidic antifungal compound is markedly enhanced when at least one further acid is added. The present invention therefore provided a composition comprising a polyene antifungal agent an acidic antifungal compound, and an additional acid compound.

According to one aspect of the invention a composition is disclosed which consists of a polyene antifungal agent, in particular natamycin, in combination with an organic acidic antifungal agent, in particular propionic acid, benzoic acid and/or sorbic acid or their salts and at least one additional acidic compound such as acetic acid, ascorbic acid, benzoic acid, citric acid, hydrochloric acid, lactic acid, propionic acid, salicylic acid and sorbic acid, or their salts. In particular alkali metal and alkali earth metal salts are useful. In particular the composition is useful to prevent the growth of mold which are more tolerant towards polyene fungicides. A preferred embodiment of the invention is the combination of natamycin with propionic or sorbic acid and acetic acid or their alkali metal or alkali earth metal salts.

The invention also provides a method for treating foods and agricultural products with said compositions. The treatment generally comprises immersing the products in a liquid containing the composition or the composition may be incorporated into a coating emulsion which can be applied by brushing or with a spray device.

Further the invention provides foods and agricultural products when treated with a composition of the invention.

DESCRIPTION OF THE PREFERRED EMBODIMENTS

Figure 1:
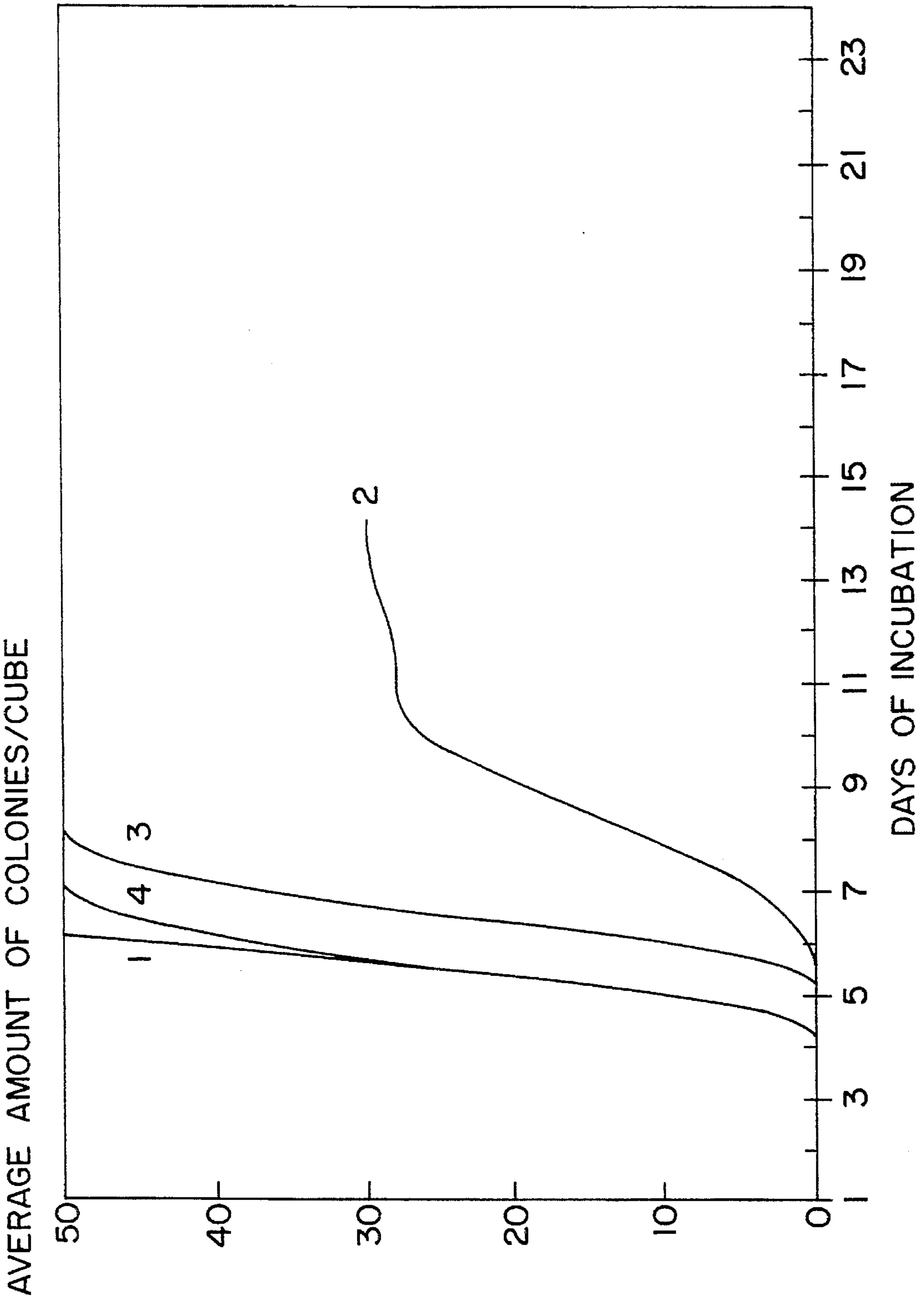

The composition of the present invention generally comprises from 0.01% to 1% by weight antifungal agent, from 0.05% to 5% by weight acidic antifungal compound and from 0.05% to 5% by weight additional acidic compound.

The polyene antifungal agent may be, for example, natamycin, lucensomycin, nystatin or amphotericin B. Preferred polyenes are natamycin and lucensomycin.

When products are coated by immersion, the solution in which they are immersed generally comprises 0,01% (w/v) to 2% (w/v), preferably from 0.01% (w/v) to 1% (w/v).

Useful surfactants are for example anionic tensides like sodium lauryl sulphate or polyethylene alkyl ethers like Cetomacrogol® 1000 or polyoxyethylene alkyl ethers like Tween® 60.

In a coating emulsion the amount of natamycin may be from 0.005 to 2% (w/v), preferably from 0.01 to 1% (w/v) and more preferably from 0.01 to 0.5% (w/v). The coating emulsion may be of the oil in water or water in oil type. According to a preferred embodiment, the emulsion is one which is routinely brought into contact with the product. For example, for the treatment of hard cheeses an aqueous polymer emulsion of the polyvinyl acetate type may be used.

The organic acidic antifungal agent may be benzoic acid, propionic acid, salicylic acid, sorbic acid or an alkali metal or alkali earth metal salt thereof. The acids may be used in an amount of 0.01 to 10% (w/v), preferably 0.05 to 5% (w/v), more preferably 0.1 to 3% (w/v).

The additional acids may be one or more chosen from the following: citric acid, acetic acid, hydrochloric acid, tartaric acid, fumaric acid, ascorbic acid, lactic acid, sorbic acid, propionic acid, butyric acid or an alkali metal or alkali earth metal salt thereof. The amount of the additional organic acid may be from 0.01 to 10% (w/v), preferably 0.05 to 5% (w/v), ore preferably 0.1 to 3% (w/v).

The composition is generally incorporated in an aqueous solution or suspension for immersion treatments of foods or agricultural products. The solution or suspension may also be applied by spraying it onto the product. Further the composition may be incorporated in a coating emulsion. Accordingly, the present invention provides liquid preparations, for example solutions and emulsions for treating foods or agricultural products containing said composition. In principle all kinds of emulsions are suitable, for example a polymer emulsion of the polyvinyl acetate type may be used for treatment of cheeses. Preferably the pH of the liquid preparations is from 1 to 10, more preferably from 2 to 8 and most preferable from 3.5 to 7.5. The pH of said preparations may be adjusted by any method e.g. by adding an acidic or a basic compound. Useful acids are for example citric acid, lactic acid, hydrochloric acids, phosphoric acid, sulfuric acid or tartaric acid. Useful basic compounds are for example sodium hydroxide, potassium hydroxide, ammonia or calcium hydroxide.

The Figures illustrate the average amount of colonies per 5x5x5 $cm^3$ cube of cheese as a function of time.

LEGENDS TO THE FIGURES

FIG. 1: Comparison of the effect on the inhibition of *Penicillium echinulatum* var. discolor on cheese by a treatment with blank Plasticoat® or Plasticoat® containing resp. natamycin, calcium propionate or calcuim acetate.

Figure 2:
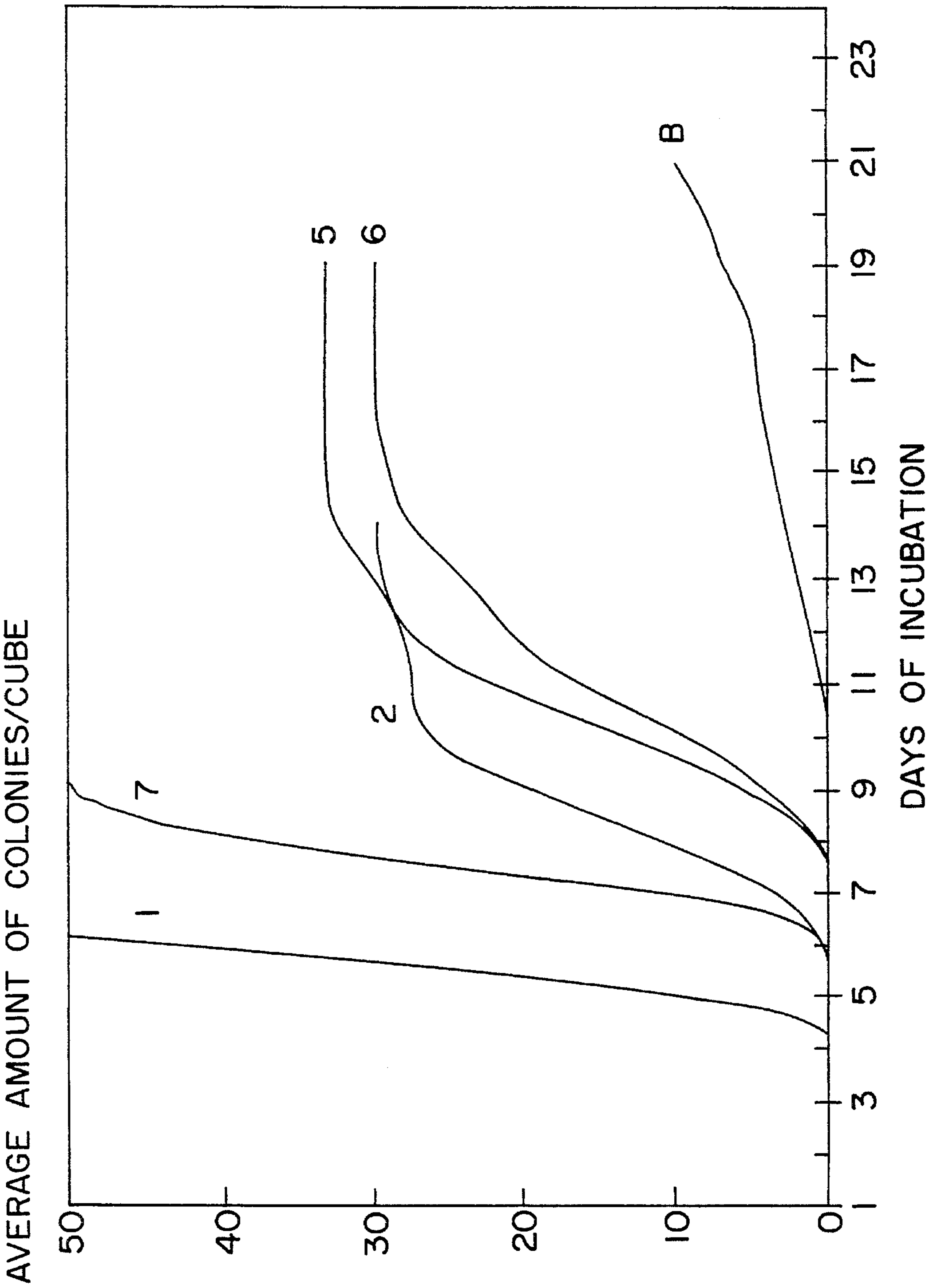

FIG. 2: Comparison of the effect on the inhibition of *Penicillium echinulatum* var. discolor on cheese by a treatment with blank Plasticoat® or Plasticoat® containing resp. natamycin alone or natamycin in combination with calcium propionate and/or calcium acetate.

Figure 3:
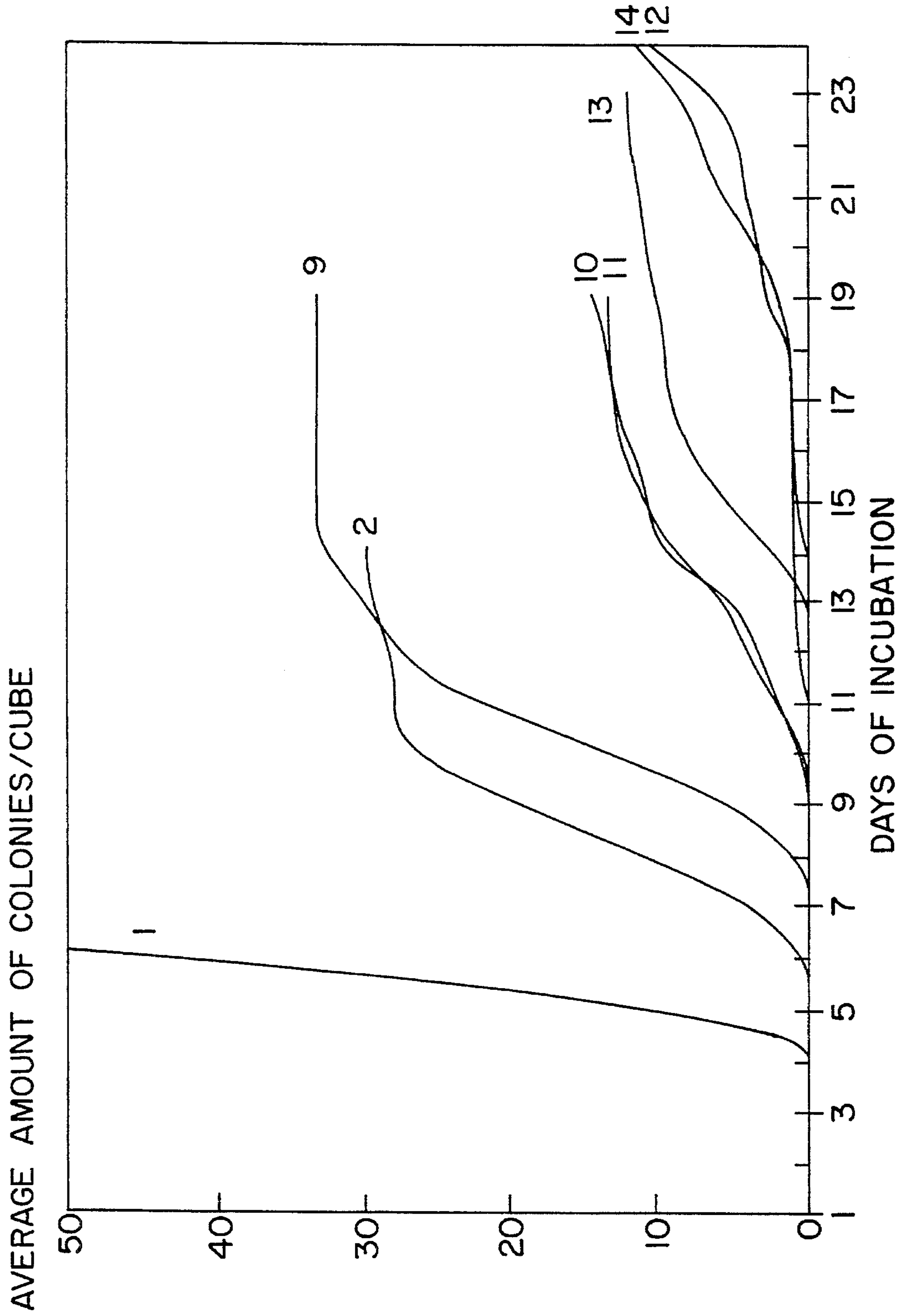

FIG. 3: Comparison of the effect on the inhibition of *Penicillium echinulatum* var. discolor on cheese by a treatment with blank Plasticoat® or Plasticoat® containing natamycin alone or natamycin in combination with different amounts of calcium propionate with or without an additional amount of calcium acetate.

Figure 4:
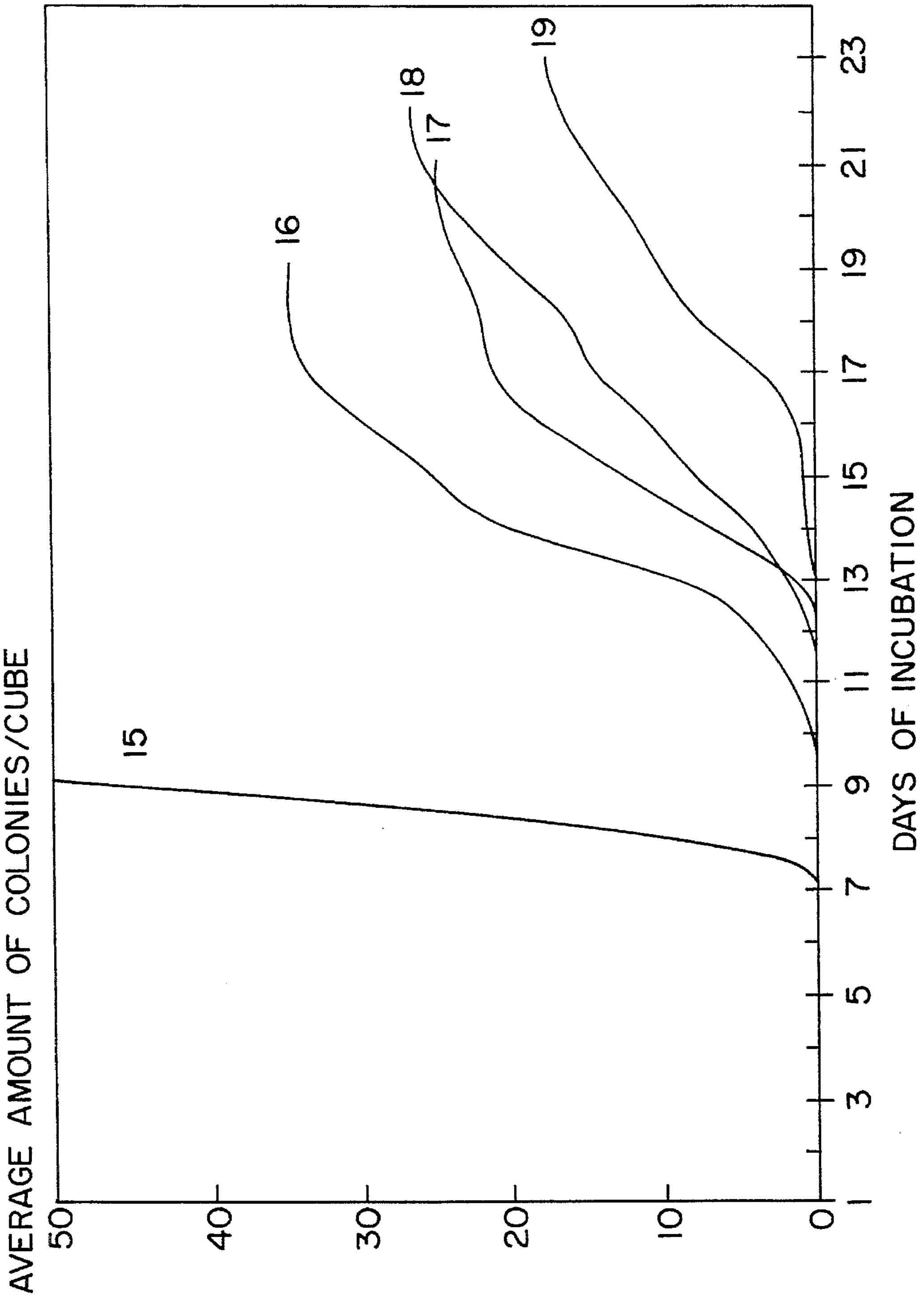

FIG. 4: Comparison of the effect on the inhibition of *Aspergillus ochraceus* on cheese by a treatment with blank Plasticoat® or Plasticoat® containing resp. natamycin alone or natamycin in combination with calcium propionate and/or calcium acetate.

Figure 4A:
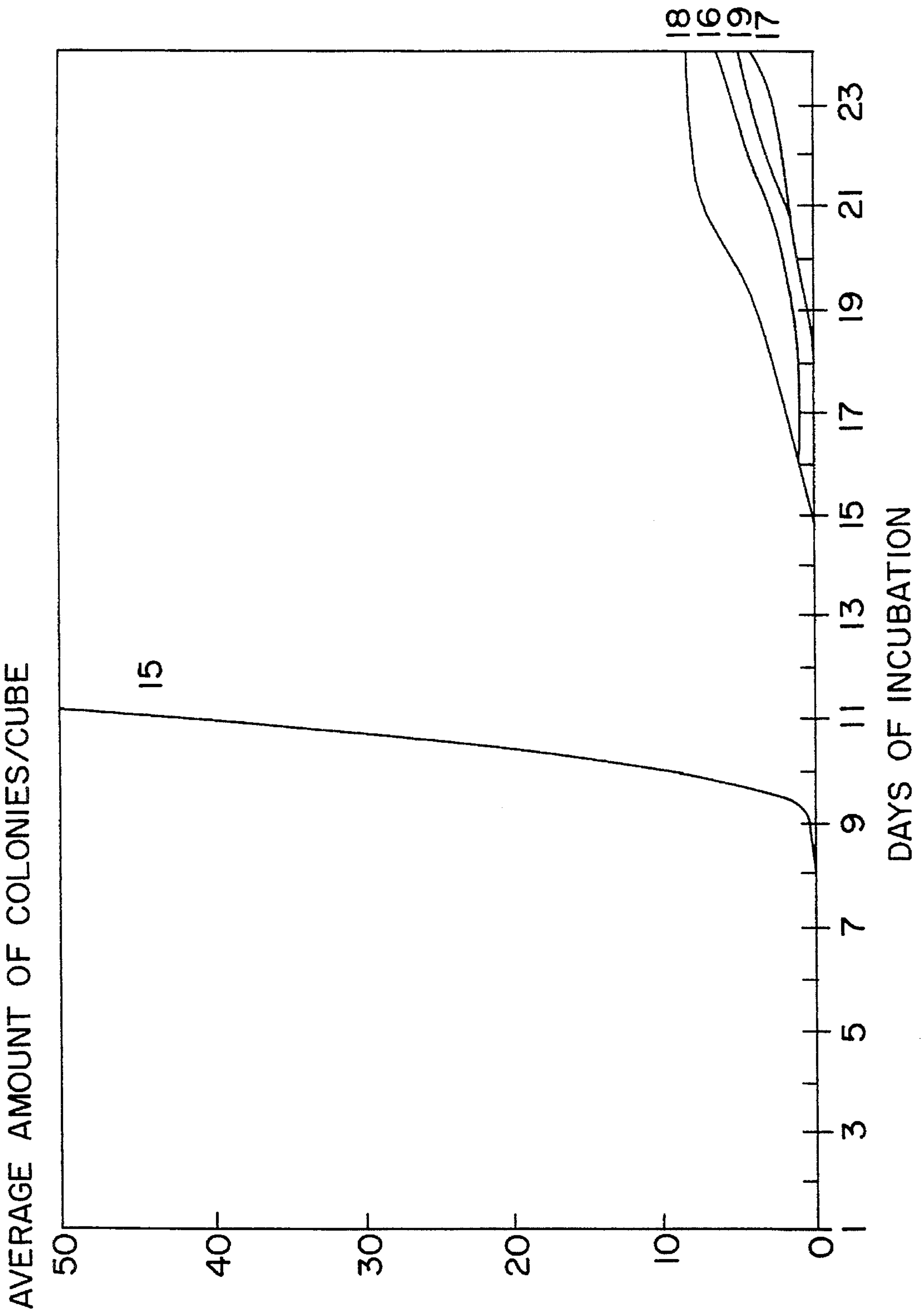

FIG. 4*a:* Comparison of the effect on the inhibition of *Aspergillus parasiticus* on cheese by a treatment with blank Plasticoat® or Plasticoat® containing resp. natamycin alone or natamycin in combination with calcium propionate and/or calcium acetate.

Figure 5:
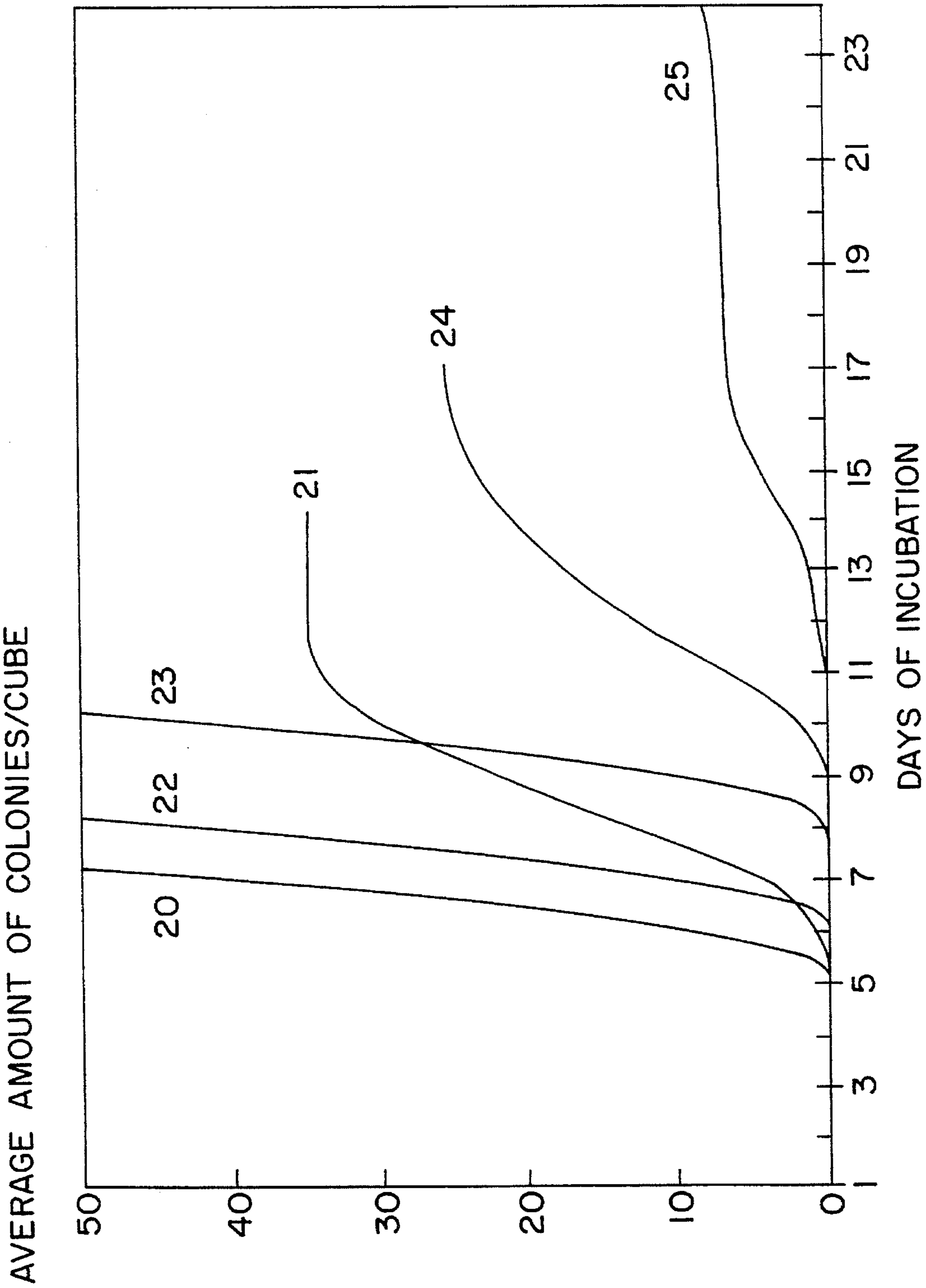

FIG. 5: Comparison of the effect on the inhibition of *Penicillium echinulatum* var. discolor on cheese by a treatment with blank Plasticoat® or Plasticoat® containing resp. natamycin alone or natamycin in combination with sodium benzoate and/or calcium acetate.

All publications and patent applications cited in this specification are herein incorporated by reference as if each individual publication or patent application was specifically and individually indicated to be incorporated.

EXAMPLES

The present invention is illustrated by the following Examples.

Example 1

In the following experiment the effect of natamycin (0.05%), calcium propionate (2%) and calcium acetate (1.5%), separately and in combination, on mould prevention on the surface of cheese was compared.

The different compositions (see Table 1) were incorporated into Plasticoat®, an aqueous emulsion of polyvinyl acetate acquired from National Starch & Chemical B.V., which is used as a cheese coating. When necessary the pH of the different compositions were adjusted to 4.0 by the addition of a 90% solution of L(+)-lactic acid.

TABLE 1

| NUMBER | COMPOSITION |
|---|---|
| | FIG. 1 |
| 1 | blank Plasticoat ® |
| 2 | natamycin 0.05% (reference) |
| 3 | Ca-propionate 2.0% |
| 4 | Ca-acetate 1.5% |
| | FIG. 2 |
| 1 | blank cheesecoating |
| 2 | natamycin 0.05% (reference) |
| 5 | natamycin 0.05% + Ca-propionate 2.0% |
| 6 | natamycin 0.05% + Ca-acetate 1.5% |
| 7 | Ca-propionate 2.0% + Ca-acetate 1.5% |
| 8 | natamycin 0.05% + Ca-propionate 2.0% + Ca-acetate 1.5% |

A freshly brined wheel of Couda cheese was first cut horizontally into two parts. Each part was then cut into pieces of 5 by 5 cm. Only pieces with a flat original surface were taken for the experiment. The pieces of cheese were dipped into a bath of melted paraffin of 80° C. in such a manner that the original surface area remained free of paraffin, while the other five surfaces were covered by a thin film of solidified paraffin.

The original surface area (the rind) was then inoculated with about $6\times10^3$ CFU (Colony Forming Units) per $cm^2$ of a mixture of spores of three strains of *Penicillium echinulatum* var. discolor (CBS numbers 611.92, 612.92 and 613.92, deposited on Dec. 8, 1992 with the CBS). The inoculation was performed by applying 0.15 ml of a spore suspension containing about 10° CFU/ml to the surface of the piece of cheese. The inoculum was evenly divided over the surface by means of a sterile swab, which was saturated with the original spore suspension.

After standing overnight in closed plastic boxes at about 6° C. the pieces of cheese were treated with the different compositions. For each treatment 10 pieces of cheese were taken. On each piece 0.8 ml of the Plasticoat® composition was applied and evenly spread over the surface of the cheese by means of a sterile rectangular piece of plastic spatula of about 2 by 5 cm.

After standing for 2 hours at ambient conditions the pieces of cheese were incubated at 15° C. and a relative humidity of 95%.

Every day the amount of visible colonies formed on the pieces of cheese was counted and the average amount per piece calculated. When the amount of colonies on a piece of cheese exceeded the value of 50, the piece of cheese was considered to be totally covered with mould. The results are shown in FIGS. 1 and 2.

It is clear that the treatment with a composition according to the invention (number 8) resulted in a protection against mold growth which was better than a treatment with the single components (numbers 2, 3 and 4) or a combination of two of each component (numbers 5, 6 and 7).

The pieces treated with only Plasticoat® (blank, number 1) and the pieces treated with calcium acetate or calcium propionate alone (resp. 4 and 3) were totally covered with mold within 6 days. The pieces which were treated with a combination of calcium propionate and calcium acetate (7) were totally covered by mould within 7 days. The pieces which were treated with natamycin alone (2) remained free of mould during 6 days, but became gradually more covered with mold until after about 9 days the average amount of colonies reached a maximum value of approximately 30. The pieces treated with natamycin and calcium propionate (5) or with natamycin and calcium acetate (6) were free of mold up to 9 days, but after about 12 days an average amount of about 30 colonies per piece was reached. The combination of natamycin and the two acids however extended the mouldfree period to 11 days, while after 20 days still only an average amount of about 10 colonies per piece of cheese was reached.

Example 2

In the same series of experiments of Example 1 the concentration of calcium propionate was also varied. The different variations are summarized in Table 2 (see Table 2) and the results are summarized in FIG. 3. The results demonstrated very clearly the additional effect of calcium acetate to the mould prevention of the combination of natamycin with calcium propionate. In every case the mould prevention was enhanced by the addition of 0.5% of calcium acetate. (Resp. composition 10 versus composition 9, 12 versus 11 and 14 versus 13)

TABLE 2

| NUMBER | COMPOSITION |
|---|---|
| | FIG. 3 |
| 1 | blank Plasticoat ® |
| 2 | natamycin 0.05% (reference) |
| 9 | natamycin 0.05% + Ca-propionate 2% |
| 10 | natamycin 0.05% l Ca-propionate 2% + Ca-acetate 0.5% |
| 11 | natamycin 0.05% + Ca-propionate 3% |
| 12 | natamycin 0.05% + Ca-propionate 3% + Ca-acetate 0.5% |
| 13 | natamycin 0.05% + Ca-propionate 4% |
| 14 | natamycin 0.05% + Ca-propionate 4% l Ca-acetate 0.5% |

Example 3

In the following experiment the inhibition of the growth on cheese of *Aspergillus ochracheus by natamycin* (0.05%) and by the combination of natamycin with calcium propionate (2%) and/or calcium acetate (1.5%) was compared. This strain of *Aspergillus ochracheus,* like *Penicillium echinudatum* var. discolor, is a species which is less susceptible to the action of natamycin.

The different compositions (Table 3) were incorporated into Plasticoat®. When necessary the pH of the different cömpositions were adjusted to 4.0 by the addition of a 90% solution of L(1)-lactic acid.

TABLE 3

| NUMBER | COMPOSITION |
|---|---|
| | FIG. 4 |
| 15 | blank Plasticoat ® |
| 16 | natamycin 0.05% (reference) |
| 17 | natamycin 0.05% + Ca-propionate 2.0% |
| 18 | natamycin 0.05% + Ca-acetate 1.5% |
| 19 | natamycin 0.05% + Ca-propionate 2.0% + Ca-acetate 1.5% |

A freshly brined wheel of Gouda cheese was first cut horizontally into two parts. Each part was then cut into pieces of 5 by 5 by 5 cm. Only pieces with a flat original surface were taken for the experiment. The pieces of cheese were dipped into a bath of melted paraffin of 80° C. in such a manner that the original surface area remained free of paraffin, while the other five surfaces were covered by a thin film of solidified paraffin.

The original surface area (the rind) was then inoculated with about $6\times10^3$ CFU per $cm^2$ of spores of *Aspergillus ochracheus* (CBS number 659.93, deposited on Dec. 15, 1993 with the CBS). The inoculation was performed by applying 0.15 ml of a spore suspension containing about $10^6$ CFU/ml to the surface of the piece of cheese. The inoculum was evenly divided over the surface by means of a sterile swab, which was saturated with the original spore suspension.

After standing overnight in closed plastic boxes at about 6° C. the pieces of cheese were treated with the different compositions. For each treatment 6 pieces of cheese were taken. On each piece 0.8 ml of the Plasticoat® composition was applied and evenly divided over the surface of the cheese by means of a sterile rectangular plastic spatula of about 2 by 5 cm.

After standing for 2 hours at ambient conditions the pieces of cheese were incubated at 15° C. and a relative humidity of 95%.

Every day the amount of visible colonies formed on the pieces of cheese was counted and the average amount per piece calculated. When the amount of colonies on a piece of cheese exceeded the value of 50, the piece of cheese was considered to be totally covered with mold.

The results are summarized in FIG. 4.

It is clear that the treatment with a composition according to the invention (number 19) resulted in a protection against growth of *Aspergillus ochracheus* which was better than a treatment with the blank (number 15) or with natamycin alone (number 16) or a combination of natamycin and calcium propionate (number 17) or natamycin and calcium acetate (number 18).

Example 3a

The experiment as described in example 3 was repeated except that the pieces of cheese were inoculated by *Aspergillus parasiticus* is stead of *Aspergillus ochracheus.* This strain of *Aspergillus parasiticus* is a species which is susceptible to the action of natamycin.

The piece of cheese were inoculated with about $6 \times 10^3$ $CFU/CM^2$ of spores of *Aspergillus parasiticus* (ATCC 11492) by applying 0.15 ml of a spore suspension containing about $10^5$ CFU/ml to the surface of each piece of cheese.

The different compositions used for the treatments are summarized in table 3a.

TABLE 3a

| NUMBER | COMPOSITION |
|---|---|
| | FIG. 4a |
| 15 | blank Plasticoat ® |
| 16 | natamycin 0.05% (reference) |
| 17 | natamycin 0.05% + Ca-propionate 2.0% |
| 18 | natamycin 0.05% + Ca-acetate 1.5% |
| 19 | natamycin 0.05% + Ca-propionate 2.0% + Ca-acetate 1.5% |

The results are summarized in FIG. **4*a***.

The effect of all treatments except for the blank have about the same result. Towards a species which is susceptible to the action of natamycin a composition according to the invention (number 19) have no additional advantage in comparison to a treatment with natamycin alone (number 16) or a combination of natamycin and calcium propionate (number 17) or natamycin and calcium acetate (number 18).

Example 4

In the following experiment the inhibition of the growth on cheese of *Penicillium echinulatum* var. discolor by natamycin (0.05%) and by sodium benzoate (2%) alone or combined with calcium acetate (1.5%) was compared with the composition of the invention. (See table 4)

When necessary the pH of the different compositions were adjusted to 4.0 by the addition of a 90% solution of L(+)-lactic acid.

TABLE 4

| NUMBER | COMPOSITION |
|---|---|
| | FIG. 5 |
| 20 | blank Plasticoat ® |
| 21 | natamycin 0.05% (reference) |
| 22 | Na-benzoate 2.0% |
| 23 | Na-benzoate 2.0% + Ca-acetate 1.5% |
| 24 | natamycin 0.05% + Na-benzoate 2.0% |
| 25 | natamycin 0.05% + Na-benzoate 2.0% + Ca-acetate 1.5% |

Further the experiment was executed in the same way as described in detail in example 1, except that for each treatment 6 pieces of cheese were taken in stead of 10. The results are summarized in FIG. 5.

It is clear that the treatment with a composition according to the invention (number 25) resulted in a protection against growth of *Penicillium echinulatum* var. discolor which was better than the other treatments.

We claim:

1. An aqueous composition free of alcohol comprising 0.01 to 1.0% by weight of a polyene antifungal agent and 0.05 to 5.0% by weight of an acidic antifungal compound selected from the group consisting of benzoic acid, propionic acid and sorbic acid, and 0.05 to 5.0% by weight of an additional acid or an alkaline earth metal salt thereof selected from the group consisting of acetic acid and lactic acid.

2. A composition of claim 1 wherein the antifungal agent is selected from the group consisting of natamycin, lucensomycin, nystatin and amphotericin B.

3. A solution comprising a composition as claimed in claim 1 wherein the solution comprises 0.01 to 2% (w/v) antifungal agent, 0.01 to 10% (W/V) acidic antifungal compound and from 0.01 to 10% (w/v) additional acid compound.

4. A coating emulsion comprising a composition as claimed in claim 1 wherein the emulsion comprises 0.005 to 2% (w/v) antifungal agent, 0.01 to 10% (w/v) acidic antifungal compound and 0.01 to 10% (w/v) additional acid compound.

5. A composition of claim 1 wherein the polyene antifungal compound is selected from the group consisting of natamycin, lucensomycin, nystatin and amphotericin B.

6. A method for treating food or agricultural products to inhibit molds which are less susceptible to the action of a polyene antifungal agent comprising coating the product with an aqueous composition free of alcohol and having a pH between 3.5 and 7.5, said composition comprising 0.01 to 1.0% by weight of a polyene antifungal agent, 0.05 to 5.0% by weight of an acidic antifungal compound selected from the group consisting of benzoic acid, propionic acid and sorbic acid, and 0.05 to 5.0% by weight of and additional acid or an alkaline earth metal salt thereof selected from the group consisting of acetic acid and lactic acid.

7. A composition comprising 0.01 to 1.0% by weight of polyene antifungal agent, 0.05 to 5.0% by weight of an acidic antifungal compound selected from the group consisting of benzoic acid, propionic acid, sorbic acid and their salts and 0.05 to 5% by weight of an additional acid selected from the group consisting of acetic acid, lactic acid and their salts.

* * * * *